United States Patent [19]
Talley et al.

[11] Patent Number: 5,900,516
[45] Date of Patent: May 4, 1999

[54] METHOD FOR PREDETERMINING A POLYMER FOR INHIBITING HYDRATE FORMATION

[75] Inventors: Larry Dalton Talley, Friendswood; Russell Harlan Oelfke, Houston, both of Tex.

[73] Assignee: Exxon Production Research Company, Houston, Tex.

[21] Appl. No.: 08/948,504

[22] Filed: Oct. 10, 1997

Related U.S. Application Data

[63] Continuation of application No. 08/600,386, Feb. 12, 1996, abandoned
[60] Provisional application No. 60/002,443, Aug. 16, 1995.
[51] Int. Cl.⁶ .................................. C07C 7/20; F17D 1/05
[52] U.S. Cl. ...................... 585/15; 585/950; 208/48 AA; 166/310; 166/371; 137/3; 137/13; 252/8.551
[58] Field of Search ................ 585/15, 950; 208/48 AA; 166/310, 371; 137/3; 252/8.551

[56] References Cited

U.S. PATENT DOCUMENTS

| | | | |
|---|---|---|---|
| 5,420,370 | 5/1995 | Sloan, Jr. | 585/15 |
| 5,432,292 | 7/1995 | Sloan, Jr. | 585/15 |
| 5,491,269 | 2/1996 | Colle et al. | 585/15 |
| 5,639,925 | 6/1997 | Sloan, Jr. et al. | 585/15 |

OTHER PUBLICATIONS

"Inhibition of Crystal Growth in Methane Hydrate", Tim J. Carver, Michael G. B. Drew and P. Mark Rodger, J. Chem. Soc. Faraday Trans., Oct. 1995, 91(19), pp. 3449–3460.

*Primary Examiner*—Elizabeth D Wood
*Attorney, Agent, or Firm*—K. D. VanTassel; D. Y. Wolfs

[57] ABSTRACT

A method for inhibiting the formation and/or agglomeration of clathrate hydrates in a petroleum fluid stream containing water is disclosed. The disclosed method uses predetermined inhibitors having a guest group, a polymer backbone, and an anchor group positioned between the guest group and the polymer backbone. The inhibitor predetermination method comprises selection of the polymer backbone, anchor group and guest group using several types of criteria. The polymer backbone should produce a substantially water soluble polymer in combination with the anchor group and the guest group. The anchor group should be a hydrophilic moiety with between one and four hydrogen bonding atoms. The guest group should be either a hydrophobic or amphiphilic moiety with a carbon atom to heteroatom ratio greater than or equal to about two to one and an average van der Waals diameter between about 3.8 angstroms and about 8.6 angstroms. Some inhibitors selected using the disclosed predetermination method have produced a subcooling temperature of about 30.0° F. Of 56 predetermined inhibitors, 18 have produced a subcooling temperature $\geq$24.0° F., 22 have produced a subcooling temperature <24.0° F. but $\geq$15.0° F., and 16 have produced a subcooling temperature <15.0° F. but >10.0° F.

7 Claims, No Drawings

METHOD FOR PREDETERMINING A POLYMER FOR INHIBITING HYDRATE FORMATION

This application is a continuation of patent application Ser. No. 600,386, filed Feb. 12, 1996, now abandoned, which was based on U.S. provisional patent application Ser. No. 60/002,443 filed in the name of R. H. Oelfke and L. D. Talley on Aug. 16, 1995, now abandoned.

FIELD OF THE INVENTION

The present invention relates to a method for inhibiting the formation of clathrate hydrates in a fluid. More specifically, the invention relates to a method for predetermining a polymer that may be used alone or in cooperation with other substances for inhibiting the formation of gas hydrates in a pipe used to convey oil or gas.

BACKGROUND OF THE INVENTION

Carbon dioxide, hydrogen sulfide, and various hydrocarbons, such as methane, ethane, propane, normal butane and isobutane, are present in natural gas and other petroleum fluids. However, water is typically found mixed in varying amounts with such petroleum fluid constituents. Under conditions of elevated pressure and reduced temperature clathrate hydrates can form when such petroleum fluid constituents or other hydrate formers are mixed with water. Clathrate hydrates are water crystals which form a cage-like structure around guest molecules such as hydrate forming hydrocarbons or gases. Some hydrate forming hydrocarbons include, but are not limited to, methane, ethane, propane, isobutane, butane, neopentane, ethylene, propylene, isobutylene, cyclopropane, cyclobutane, cyclopentane, cyclohexane, and benzene. Some hydrate forming gases include, but are not limited to, oxygen, nitrogen, hydrogen sulfide, carbon dioxide, sulfur dioxide, and chlorine.

Gas hydrate crystals or gas hydrates are a class of clathrate hydrates of particular interest to the petroleum industry because of the pipeline blockages that they can produce during the production and/or transport of natural gas and other petroleum fluids. For example, at a pressure of about 1 MPa ethane can form gas hydrates at temperatures below 4° C., and at a pressure of 3 MPa ethane can form gas hydrates at temperatures below 14° C. Such temperatures and pressures are not uncommon for many operating environments where natural gas and other petroleum fluids are produced and transported.

As gas hydrates agglomerate they can produce hydrate blockages in the pipe or conduit used to produce and/or transport natural gas or other petroleum fluid. The formation of such hydrate blockages can lead to a shutdown in production and thus substantial financial losses. Furthermore, restarting a shutdown facility, particularly an offshore production or transport facility, can be difficult because significant amounts of time, energy, and materials, as well as various engineering adjustments, are often required to safely remove the hydrate blockage.

Hydrate Nucleation

A labile cluster is a precursor to gas hydrate nucleation, also referred herein, as hydrate nucleation or formation of hydrate nuclei. A labile cluster is a water structure consisting of two or more guest molecules surrounded by an irregular polyhedral network of water molecules in the liquid phase which has not yet stabilized into hydrate nuclei. By contrast, hydrate nuclei have a regular network of water molecules in the solid phase. The labile cluster's water molecules are held around a hydrate forming gas molecule by hydrogen bonding with each other. Such hydrogen bonding forces are sufficiently weak that water molecules form a "flexible" water shell. Typically, some water molecules break from their shell and other water molecules in the immediate vicinity fill the void produced by the departing water molecules. Hence, the cluster's water molecules are considered labile.

Hydrate nuclei are the precursors to hydrate crystal formation. Hydrate crystal formation typically occurs shortly after the onset of hydrate nucleation. Consequently, inhibiting the hydrate nucleation rate is important in inhibiting the formation of hydrate crystals that can lead to pipeline blockages.

Consequently, if labile clusters are dissociated back to individually dispersed gas molecules and water molecules the hydrate nucleation rate can be inhibited. However, once the labile clusters release the heat of fusion necessary for producing a solid structure, hydrate nuclei are formed. One typical way for labile clusters to lose their heat of fusion, thereby becoming a thermodynamically stable solid, is by adsorption to a comparatively cold solid surface. The labile cluster may transfer its latent heat of fusion to such a surface or any other available "heat sink", such as the surrounding liquid. As heat energy is transferred, the water comprising the labile cluster undergoes a transition from a liquid state to a solid state and captures (i.e., enclathrates) several gas molecules in a regular polyhedral network of water molecules forming a series of solid cages. Such a process is commonly referred to as hydrate nucleation.

Labile clusters form from individual hydrate forming gas molecules dissolved in the aqueous phase. As indicated above, hydrate nucleation can occur near a water-solid interface, such as a cold metal surface. Natural gas molecules, such as those indicated above, are usually at low concentrations in the water phase found in a typical gas-water system. After initial hydrate nucleation occurs, hydrate crystal growth and additional hydrate nucleation may remain slow if the hydrate forming gas molecules must diffuse into the interior of the water phase to find the hydrate nuclei. However, when the hydrate nuclei move nearer the interface between the system's gas and water phases, the rate of hydrate nucleation, and ultimately, hydrate crystal growth, accelerates because gas molecules are supplied more quickly at the gas-water interface where they have a shorter diffusion path.

A variety of measures have been used by the oil and gas industry to prevent the formation of hydrate blockages in oil or gas streams. Such measures include maintaining the temperature and/or pressure outside hydrate formation conditions and introducing an antifreeze such as methanol, ethanol, propanol, or ethylene glycol. From an engineering standpoint, maintaining temperature and/or pressure outside hydrate formation conditions requires design and equipment modifications, such as insulated or jacketed piping. Such modifications are costly to implement and maintain. The amount of antifreeze required to prevent hydrate blockages is typically between 20% to 40% by weight of the water present in the oil or gas stream. Consequently, several thousand gallons per day of such solvents can be required. Such quantities present handling, storage, recovery, and potential toxicity issues to deal with. Moreover, these solvents are difficult to completely recover from the production or transportation stream.

Consequently, there is a need for a gas hydrate inhibitor that can be conveniently mixed at low concentrations in the produced or transported petroleum fluids. There is also a need for a method that will identify candidate substances that are more likely than not to be effective as inhibitors. Such an inhibitor should reduce the rate of nucleation, growth, and/or agglomeration of gas hydrate crystals in a petroleum fluid stream and thereby inhibit the formation of a hydrate blockage in the pipe conveying the petroleum fluid stream.

One method of practicing the present invention uses gas hydrate inhibitors which can be used in the concentration range of about 0.01% to about 5% by weight of the water present in the oil or gas stream. The invention described below provides a method of either designing or selecting such gas hydrate inhibitors and thereby defines a broad class of polymers that can be used as gas hydrate inhibitors.

SUMMARY OF THE INVENTION

According to the invention there is provided a method for inhibiting the formation of clathrate hydrates in a fluid having hydrate forming constituents using a predetermined inhibitor having a guest group, a polymer backbone, and an anchor group positioned therebetween, said method comprising:

(c) predetermining said polymer backbone for producing a substantially water soluble polymer having said polymer backbone, said anchor group and said guest group;

(b) predetermining said anchor group, said anchor group being a hydrophilic compound having between one and four hydrogen bonding atoms; and (c) predetermining said guest group, said guest group,
  (i) being selected from the group consisting of hydrophobic or amphiphilic compounds having a ratio of carbon atoms to heteroatoms greater than or equal to about two to one; and
  (ii) having an average van der Waals diameter between about 3.8 angstroms and about 8.6 angstroms;

(d) obtaining said predetermined inhibitor; and (e) treating said fluid with said predetermined inhibitor.

DETAILED DESCRIPTION OF THE INVENTION

Overview of Inhibitor Selection Method

A polymer can be either selected for or designed to have chemical constituents that are energetically attractive to a labile cluster. The polymer can be selected or designed to be a labile cluster binding site, where the cluster attaches or "sticks" to the polymer by hydrogen bonding and, ultimately, dissociates the cluster into liquid water and non-enclathrated gas. Such a polymer does not undergo a chemical change as it associates with and then facilitates dissociation of labile clusters. Consequently, the polymer can perform numerous cycles in the labile cluster dissociation process without degradation. Water-gas systems containing such polymers can be cooled below the temperature for onset of hydrate nucleation of an uninhibited system. Such an inhibited system is commonly referred to as being supercooled relative to its uninhibited counterpart. Supercooling can occur to the extent that the cluster's rate of diffusion to a polymer binding site in the gas-water system and rate of dissociation are greater than the rate of labile cluster formation. As the system's temperature drops, however, the rate of labile cluster formation increases. Therefore, as the system's temperature becomes progressively cooler a temperature is encountered where the labile cluster formation rate will exceed the cluster's combined diffusion rate and inhibitor induced dissociation rate. At that temperature, the onset of hydrate nucleation (i.e., the inception of hydrate crystal formation) will be observed. Typically, shortly thereafter, hydrate crystal formation will occur relatively rapidly.

Polymers which can dissociate labile clusters should be glass-forming polymers. Glass-forming polymers are polymers that can inhibit long-range ordering required for hydrate nucleation by binding an average of at least four water molecules per monomeric unit of the polymer and maintaining the water molecules in their liquid state. In other words, each monomeric unit of a glass-forming polymer can keep its bound up water molecules in a non-freezable state. Such a bound water/polymer system can hydrogen bond to and transfer its heat to labile clusters and thereby inhibit the clusters' ability to order themselves for hydrate nuclei formation. Therefore, glass-forming polymers suitable for destroying labile clusters should have at least one hydrogen bonding atom and the ability to keep water surrounding it in a non-freezable state. Determining whether a polymer is a glass-forming polymer may be determined using differential scanning calorimetry or DSC, an analytical method well known to those skilled in the art of analytical chemistry.

Predetermining Inhibitor Candidates

The basic, repetitive structural unit of the polymer inhibitors disclosed herein and the above-identified applications are comprised of three groups: a guest group, a polymer backbone, and an anchor group positioned between the guest group and polymer backbone. These groups are positioned with respect to each other as shown below:

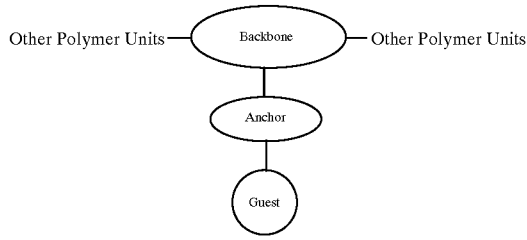

The anchor group is a hydrogen bonding group suited for keeping the polymer attached to labile clusters, while the guest group is a hydrophobic group suited for supporting a water shell of liquid water molecules. The operative principle for this gas hydrate inhibitor is that the guest/anchor group work together to stabilize a shell of water molecules around the guest, which are held intact by the anchor group hydrogen bonded to at least one of the shell's water molecules. Such a water shell containing an inhibitor, can associate with either the solid surfaces of gas hydrate nuclei or with labile clusters to inhibit their rate of formation as the bulky polymer backbone sterically interferes with the naturally ordered formation of hydrate nuclei and hydrate crystals. The procedure for predetermining suitable chemical constituents to serve as anchor groups, guest groups, and polymer backbones is described more fully below. Generally, however, effective inhibitors are able to maintain a liquid (i.e., non-freezable) water shell around the guest group. So, on average, there should be at least four non-freezable water molecules per monomeric unit of the polymer backbone for effective hydrate inhibitor performance.

Guest Group Selection

An effective guest group should have three basic attributes. It will be either hydrophobic or amphiphilic, will have an approximate van der Waals diameter between about 3.8 angstroms and about 8.6 angstroms, and preferably, will have a shape that is adaptable to the interior of one or more water structures defined below.

The hydrophobic or amphiphilic character of the guest group prevents water molecules from hydrogen bonding to it. It, therefore, behaves more like a hydrate forming gas molecule. The guest group's hydrophobic character allows water molecules to form a shell around the guest for forming labile clusters. Although the guest group may contain certain heteroatoms having some hydrophilic character, such as oxygen or nitrogen, the overall character of the guest group should be preferably hydrophobic and at least amphiphilic. The most effective guest groups, however, are saturated hydrocarbons in either a straight chain, branched, or cyclic configuration.

Also, the guest group should have geometric attributes similar to or "look like" a hydrate forming molecule. When the inhibitor's guest group is similar in size to a hydrocarbon, hydrate forming molecule, the water shell or cage that forms around such a hydrate forming molecule will resemble the labile clusters and hydrate nuclei promoted by hydrocarbon, hydrate forming molecules. Therefore, the labile clusters formed around a polymer guest/anchor can bond to the labile clusters or hydrate nuclei developed from hydrate forming hydrocarbons and thereby inhibit their rate of growth.

The range of sizes for various hydrocarbon, hydrate forming sizes typical of gas hydrates are well known to those skilled in the art. The crystal structures and the corresponding water cages and the approximate range of van der Waals' diameter for each cage listed below were obtained from "Annals of the New York Academy of Sciences, Volume 715, "International Conference on Natural Gas Hydrates", *Molecular Perspectives on Structure and Dynamics in Clathrate Hydrates* by Ripmeester, et.al., pp.163 and 167.

| Hydrate Crystal Structure | Water Cage | Water Cage's Approximate van der Waals' Diameter Range |
| --- | --- | --- |
| Structures I, II, and H | Pentagonal dodecahedron ($5^{12}$) | 3.8 Å to 4.2 Å |
| Structure I - Pm3n | Tetrakaidecahedron ($5^{12}6^2$) | 4.2 Å to 5.8 Å |
| Structure II - Fd3m | Hexakaidecahedron ($5^{12}6^4$) | 5.8 Å to 7.2 Å |
| Structure H - P6/mmm | Icosahedron ($5^{12}6^8$) | 7.2 Å to 8.6 Å |

The inhibitor's guest group may be sized in any portion of the range of approximate van der Waals diameters identified for hydrocarbon, hydrate guests in the above table. The hydrate crystal structure and water cage descriptions corresponding to each van der Waals' diameter range is for informational purposes only. Typically, the water shell forming around the inhibitor's guest group will only approximate the structures and shapes indicated for each corresponding van der Waals diameter range. For example, the inhibitor guest group having a van der Waals diameter of about 4.0 angstroms will form a water shell approximating a pentagonal dodecahedron shape because one or more water molecules are displaced by the anchor group.

Some guest group geometries, however, are better suited for promoting development of a water shell that resembles the water cage geometries identified above. For example, the guest group would preferably approximate a spherical shape, such as neopentane or cyclopentane. However, a guest group which is relatively long and narrow, such as propane or n-butane, will promote development of a water shell geometry with less resemblance to geometries identified above and thereby have a reduced inhibition effect compared to a spherically shaped inhibitor.

The guest group's position with respect to the anchor group is also important to the inhibitor's effectiveness. The guest group must be positioned so that the anchor group's hydrogen bonding constituents can hydrogen bond to one or more water molecules of the water shell or cage forming around the guest group. Appropriate orientation of the guest group relative to the anchor group can generally be satisfied by directly bonding the guest group to the anchor group. Preferably, the guest and anchor group are bonded directly to each other without any intervening linking atoms. However, one spacer atom could be used without disrupting the guest/anchor group's function. Computational chemistry models, well known to those skilled in the art, can be used to determine the preferred orientation of the guest group with respect to the anchor group. One such model is Hyperchem® sold by Autodesk Inc. of Sausalito, Calif.

Anchor Group Selection

While the Guest group shapes the water in its vicinity, the anchor group provides the hydrogen bonding for keeping the water molecules in the shell around the guest group intact. The anchor group thereby stabilizes the water shell and reduces the shell's mobility. Also, the anchor group is the one group most responsible for producing a substantially water soluble polymer. Preferably, however, the anchor group should enhance the water solubility of an otherwise substantially water soluble polymer backbone.

The anchor group's intended purpose is best achieved if it is substantially hydrophilic and has between one to four atoms to provide one or more hydrogen bonding sites for the water shell's molecules. Such a site must provide a negative polarization for hydrogen bonding with hydrogen atoms of at least one water shell molecule. The anchor group's ability to hydrogen bond will improve, however, as the number of hydrogen bonding atoms or the degree of polarization is increased. Some examples of chemical constituents with effective negative polarization for hydrogen bonding include carbonyls, amines, and ethers. Also, sulfonates and sulfones should also be effective anchor groups because of their relatively higher degree of negative polarization compared to carbonyls, amines, and ethers.

The covalent polarizability exhibited by the anchor groups shown in the inhibitor examples identified below is preferred, while a polymer with an ionic anchor group is less likely to produce an effective inhibitor.

Polymer Backbone Selection

While the guest/anchor group combination provides the mechanism for attaching the inhibitor to labile clusters or hydrate nuclei, the polymer backbone provides the blockage, or steric hindrance, for preventing further growth. The polymer backbone must be selected so that inhibitor remains substantially water soluble under the operating conditions being used. As indicated above, appropriate anchor group selection is important in producing a substantially water soluble inhibitor. For example, some polymer backbones, such as polyvinyl backbones, can remain substantially water soluble even with weaker hydrophilic anchor groups, while other polymer backbones, such as polypropylene, require stronger hydrophilic groups to produce a substantially water soluble inhibitor. To be useful in most field applications, the polymeric inhibitor must be soluble under all hydrate formation conditions encountered in the application. Also, the inhibitor should remain in solution under injection conditions.

With respect to hydrate inhibition performance, the water solubility of the inhibitor at or around the hydrate formation temperature is important for ensuring that guest/anchor groups are freely exposed to the water in the water-gas system. A number of polymer backbones are well suited for this purpose, including but not limited to, polyethylene, polypropylene, polyimine, polyglycols. More specific examples of many of such polymer backbones are identified in the inhibitors listed specified below. To the extent that the inhibitor is not water soluble, the inhibitor molecule will self-associate. Such self-association reduces exposure of the guest/anchor groups to the water in the water-gas system.

Steric hindrance is generally maximized by making the backbone as large as possible, without adversely affecting polymer solubility. Thus, a methylated, propylene based, backbone would be more effective than an ethylene based backbone. Heteroatoms, such as oxygen or nitrogen, can be incorporated into the backbone without harming functionality, so long as the charges on these heteroatoms do not adversely affect the formation and stabilization of a water shell around the guest/anchor groups. These more complex backbones can improve solubility while maximizing steric hindrance.

With respect to injecting the inhibitor under typical field conditions, the inhibitor's water solubility at higher temperatures is important for ensuring that the polymer can be effectively injected. In many oil and gas production situations, the inhibitor is injected at wellhead conditions where the temperature can range up to about 300° F. Many polymer solutions produced from polymers disclosed by this invention have a lower critical solution temperature (i.e., LCST) dependent upon a given polymer concentration. When the temperature exceeds the LCST for a particular polymer solution, the polymer precipitates from solution. Because the wellhead temperature cannot be easily lowered, it's desirable to select a polymer that produces an LCST greater than the anticipated wellhead temperature. Alternatively, the inhibitor could be injected at some point in the water-gas system where the temperature is below the polymer solution's LCST. Maintaining the inhibitor at the desired concentration, under wellhead conditions can be difficult for the best hydrate inhibitors.

Copolymer Selection

Many of the polymers designed by the above criteria will have low solubility and will produce polymer solutions with low LCSTs. A hydrophilic anchor is frequently unable to affect polymer solubility sufficiently to produce both (1) a polymer solution under hydrate formation conditions and (2) a polymer solution having an LCST greater than many wellhead temperatures. This solubility issue can be particularly difficult where the hydrophobic guest group is large and/or where the polymer backbone is hydrophobic.

When relatively large and very hydrophobic guest groups and certain hydrophobic polymer backbones are preferred, the primary polymer repeat unit can be co-polymerized with a secondary polymer repeat unit to help produce a substantially water soluble polymer under both hydrate formation and wellhead injection conditions. The secondary polymer repeat unit is typically significantly smaller and more hydrophilic than the primary polymer repeat unit which support the guest/anchor groups. The secondary polymer repeat unit will also serve to open the polymer chain to the water, resulting in greater exposure of the primary polymer repeat units' guest/anchor groups to the water phase.

Also, the secondary polymer repeat unit will act as a spacer along the polymer chain. If the primary polymer repeat units have large guest groups that are spaced too close to each other, they may interfere with the formation of water shells around guest/anchor groups pendant to adjacent repeat groups. Adding the smaller, secondary polymer repeat units, however, provides increased spacing between neighboring guest/anchor groups pendant to the polymer backbone. The guest/anchor groups have enhanced exposure to the water phase with the polymer backbone's improved solubility and increased spacing. Consequently, such a copolymer inhibitor should inhibit hydrate nucleation and crystal formation more efficiently versus its homopolymer counterpart.

INHIBITOR EVALUATION

Mini-loop Testing Procedure

One method for evaluating an inhibitor's effectiveness uses a bench-scale high pressure apparatus referred to as a mini-loop apparatus. A mini-loop apparatus consists of a loop of stainless steel tubing with about a one-half inch inside diameter and about ten feet in length. The loop also has a transparent section for observing the fluid flow in the loop and the onset of hydrate formation in the loop. Fluid comprising about 40% by volume synthetic sea water (SSW) solution having about 3.5% total ionized salts, 40% by volume hydrocarbon condensate (i.e., $C_6+$), and 20% by volume hydrocarbon gas mixture is circulated around the loop at constant pressure. The hydrocarbon gas mixture is comprised of about 76 mole % methane, 9 mole % ethane, 7 mole % propane, 5 mole % n-butane, 2 mole % iso-butane, and 1 mole % of $C_5+$. The inhibitor is typically injected into the loop as an aqueous solution to produce the desired weight percent concentration of inhibitor in the aqueous sea salt/gas solution. Generally, many hydrate inhibitors are evaluated at about 0.5 wt. % of the aqueous sea salt/gas solution.

The fluid is circulated at a constant velocity of about 2.5 feet/second. The loop and its pump lay in a controlled temperature water bath for controlling the temperature of the fluid circulating in the loop. The bath's water is circulated to ensure uniform temperature throughout the bath and rapid heat transfer between the bath water and the loop. As the loop temperature changes or as hydrates form, the gas volume in the loop will change accordingly. Therefore, to maintain constant pressure in the loop a pressure compensating device is required. Such a device can be comprised of a gas cell and a hydraulic oil cell separated by a floating piston. So as the gas volume in the loop changes, oil may be added or removed from the oil cell to produce a commensurate addition or removal of gas to the loop. Mini-loop tests are typically run at a pressure of about 1,000 pounds per square inch gauge (p.s.i.g.). However, any pressure between 0 to 3,000 p.s.i.g. could be selected for evaluating an inhibitor's performance.

The temperature of the water bath is reduced at a constant rate, preferably about 6° F. per hour, from an initial temperature of about 70° F. At some temperature, clathrate hydrates begin to rapidly form. As the dissolved gas is used to form clathrate hydrates there is an abrupt and corresponding decrease in the volume of dissolved gas in the aqueous sea salt/gas solution. The temperature at which this abrupt decrease in the volume of dissolved gas is observed is known as the temperature of onset for hydrate formation ($T_{os}$). The hydrate equilibrium dissociation temperature or $T_{eq}$ is the temperature below which hydrate formation is thermodynamically favored in an aqueous sea salt/gas solution without an inhibitor present. $T_{eq}$ is also commonly referred to as the hydrate dissociation temperature. Therefore, another measure of an inhibitor's effectiveness is the difference between $T_{eq}$ and $T_{os}$ which is known as the inhibitor's subcooling, $T_{sub}$. Therefore, for a given pressure, the greater the subcooling the more effective the inhibitor. Typically, an aqueous sea salt/gas solution with no inhibitor present produces a $T_{sub}$ of about 6–7° F. An inhibitor which increases the $T_{sub}$ for an aqueous sea salt/gas solution by about 1.5° F. demonstrates a threshold inhibition effect.

Effectiveness of Inhibitor Selection Procedure

To date there have been 56 predetermined inhibitors identified and evaluated at 0.5 wt. % using above-described inhibitor selection and evaluation procedures. Of those candidates, 18 candidates produced a $T_{sub}$ greater than or equal to 24.0° F., 22 candidates produced a $T_{sub}$ less than 24.0° F. but greater than or equal 15.0° F., and 16 candidates produced a $T_{sub}$ less than 15.0° F. but greater than or equal to 10.0° F.

Examples of Applying the Inhibitor Selection Method

Generally, the above method is used by first choosing a known class of polymer chemistry that meets the basic structural requirements for the model (backbone-anchor-guest group arrangement). This generally fixes the choice of anchor group. Second, the size of the guest group is increased as much as possible while still retaining water solubility. The geometry of the guest group is also adjusted. Also, if improved water solubility is needed the revised monomer may be copolymerized with a secondary monomer. Finally, if increased steric hindrance in the backbone is needed the polymer backbone may be methylated. The acrylamide series is used in the inhibitor selection or development process detailed below. These examples are provided to demonstrate how the above-described inhibitor selection/development procedure is applied, and are not intended to limit the scope of the invention described herein. All the inhibitors described below were evaluated at 0.5 wt. % using the above-described mini-loop testing procedure.

EXAMPLE 1

Based on the apparent water solubility of various polyacrylamides the polyacrylamide family was selected for evaluation. Using the procedures described above, poly N-ethyl acrylamide was predetermined as a hydrate inhibitor candidate and synthesized. A subcooling of 15.5° F. was measured versus an uninhibited subcooling of 6.5° F.

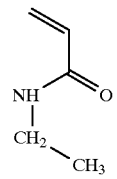

N- Ethyl Acrylamide
NEAM

EXAMPLE 2

The size of the guest group was increased by adding a second ethyl group to the N-ethyl acrylamide molecule. Molecular modeling calculations showed that the two ethyl groups would be quite near each other and could act as a single guest group. This increased the subcooling of the inhibitor to 21.5° F.

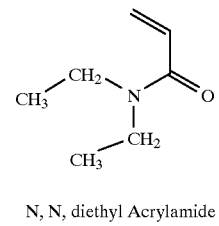

N, N, diethyl Acrylamide
NNDEAM

EXAMPLE 3

The geometry of the Guest group was improved by linking the two ethyl groups in the N,N-diethyl acrylamide to make acryloylpyrrolidine. Molecular modeling again showed that linking the guest helped to position the hydrophobic group better with respect to the amide anchor. This increased the subcooling of the inhibitor to 25.2° F. The APYD polymer solution, however, had an LCST of 95° F.

Acryloylpyrrolidine
APYD

EXAMPLE 4

To increase the polymer solubility and the polymer solution's LCST, the APYD was copolymerized with N-Vinyl, N-Methyl acetamide (VIMA). While VIMA alone has a subcooling of 12.5° F. and APYD alone has a subcooling of 25.2° F., the copolymer has a subcooling of 28.0° F. The LCST of the copolymer solution was 115° F.

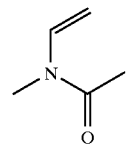

N-Vinyl, N-Methyl Acetamide
VIMA

EXAMPLE 5

To increase the steric hindrance of the backbone, Methacryloylpyrrolidine (MAPYD) was copolymerized with VIMA. This polymer has a subcooling of 29.5° F.

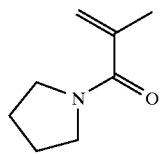

Methacryloylpyrrolidine
MAPYD

The polymers described below include some, but not all, of the inhibitors identified using the predetermination method disclosed above. These polymers are likely to function as gas hydrate inhibitors. However, as discussed noted earlier, inhibitors within a predetermined class will have a range of effectiveness. The following examples are provided for illustrative purposes only and are not intended to limit the scope of the claimed invention.

Polymers of Cyclic Imino Ethers

Certain polymers derived from ring opening cationic polymerization (i.e., ring opened cyclic imino ether polymers) are likely to function as gas hydrate inhibitors. Such polymers are described as:

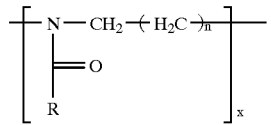

where R is hydrogen or an alkyl, alkenyl, aryl, aralkyl, alkaryl, cycloalkyl, or heterocyclic group such that the resultant polymer is substantially water soluble, n ranges from one to four and x is an average integer sufficient to produce an average molecular weight between about 1,000 to about 1,000,000.

Also, certain polymers derived from free radical or anionic polymerization cyclic imino ethers (i.e., ring closed cyclic imino ether polymers) are likely to function as gas hydrate inhibitors. Such polymers are described as:

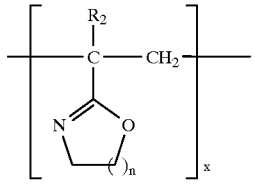

where $R_2$ is hydrogen or methyl, n ranges from one to four and x is an average number sufficient to produce an average molecular weight between 1,000 to about 1,000,000.

Substituted Polyacrylamides

Certain polymers derived from substituted acrylamides are likely to function as gas hydrate inhibitors. Such polymers are described as:

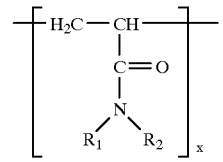

where $R_1$ is a hydrocarbon group having one to ten carbon atoms and zero to four heteroatoms selected from the group consisting of nitrogen, oxygen, sulfur, and, combinations thereof and $R_2$ is a hydrogen atom or a hydrocarbon group having one to ten carbon atoms and zero to four heteroatoms selected from the group consisting of nitrogen, oxygen, and sulfur, and combinations thereof, such that the resultant polymer is substantially water soluble, and x is an average number sufficient to produce an average molecular weight between 1,000 to about 6,000,000.

Also, certain polyacrylamides having a cyclic group, where X and Y have been substituted for $R_1$ and $R_2$, are gas hydrate inhibitors.

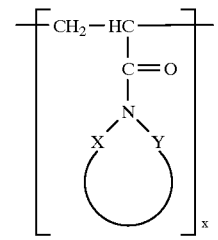

The cyclic structure produced by the X-Y linkage of such polyacrylamides may contain up to 10 atoms, with 3 to 10 carbon atoms and zero to four heteroatoms, including but not limited to, nitrogen, oxygen, and/or sulfur.

N-Vinyl Amide Polymers

Various N-vinyl amide homo- and copolymers are likely to function as gas hydrate inhibitors. Such N-vinyl amide homopolymers include the class described as follows:

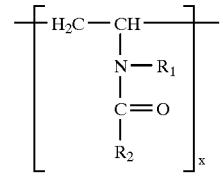

where, $R_1$ is a hydrogen or hydrocarbon group (branched, normal, or cyclic) having one to six carbon atoms and zero to two heteroatoms selected from the group consisting of oxygen and nitrogen, and combinations thereof, $R_2$ is hydrocarbon group (branched, normal, or cyclic) having one to six carbon atoms and zero to two heteroatoms selected from the group consisting of oxygen and nitrogen, and combinations thereof, and x is an average number of monomeric units for producing an average molecular weight for said polymer between about 1,000 and about 6,000,000 for said polymer.

Some specific examples of N-vinyl amide copolymers likely to function as gas hydrate inhibitors include those comprising N-methyl-N-vinylacetamide (VIMA) monomer units. Such copolymers, depicted below, include, but are not limited to, those comprising, VIMA and diethylacrylamide (VIMA/DEAM), VIMA and isopropylmethacrylamide (VIMA/iPMAM), VIMA and acryloylpyrrolidine (VIMA/

APYD), VIMA and methacryloylpyrrolidine (VIMA/ MAPYD), VIMA and acryloylhexamethyleneimine (VIMA/ AHMI), VIMA and acryloylpiperidine (VIMA/APID), VIMA and vinyl butyrate (VIMA/VBu), VIMA and ethyl maleimide (VIMA/EME), VIMA and selected lactam monomers.

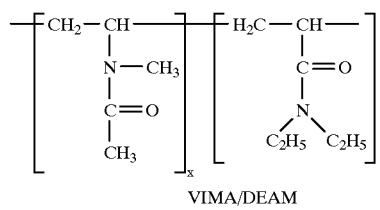
VIMA/DEAM

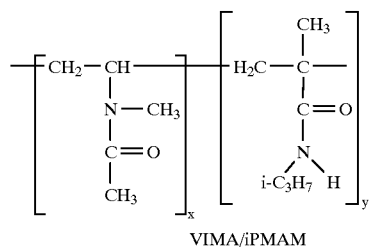
VIMA/iPMAM

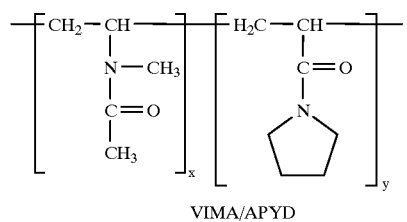
VIMA/APYD

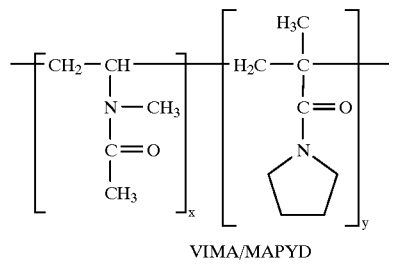
VIMA/MAPYD

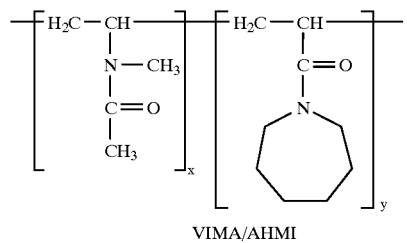
VIMA/AHMI

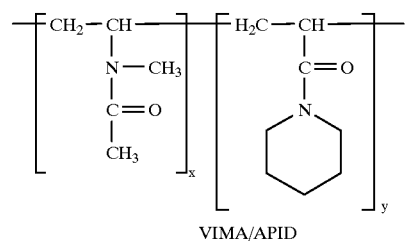
VIMA/APID

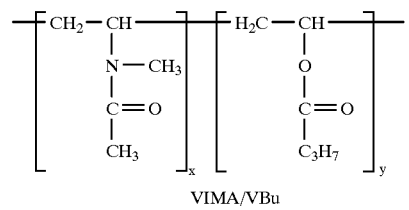
VIMA/VBu

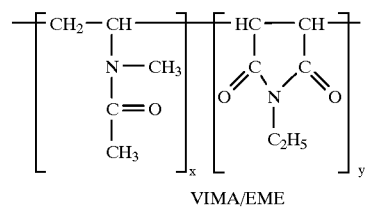
VIMA/EME

Some examples of VIMA/lactam copolymers that can function as gas hydrate inhibitors are generally described as follows:

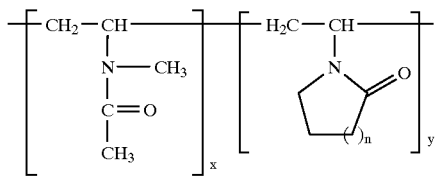

where n ranges from one to three and the sum of x and y is an average number sufficient to produce an average molecular weight between about 1,000 to about 6,000,000.

Where n=1 the resulting polymer is a copolymer of N-methyl-N-vinylacetamide and vinylpyrrolidone, VIMA/VP.

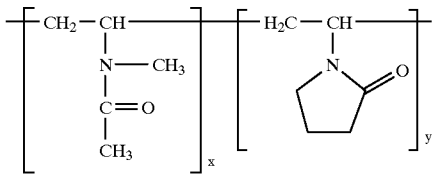
VIMA/VP

Where n=3 the resulting polymer is a copolymer of N-methyl-N-vinylacetamide and vinylcaprolactam, VIMA/VCap.

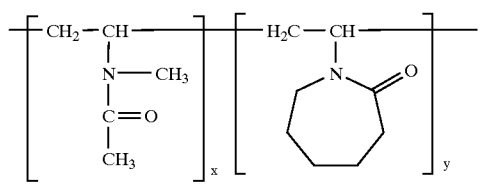

VIMA/VCap

Polymers with Methylated Backbones

Certain polymers with methylated backbones are likely to function as gas hydrate inhibitors. Some examples of homopolymers, depicted below, include, but are not limited to, acrylamide and oxazoline homopolymers having methylated backbones, such as poly(iso-propylmethacrylamide) (PiPMAM) and poly(2-isopropenyl-2-oxazoline) (PiPpenOx). Some examples of copolymers, depicted below, include, but are not limited to, copolymers comprising N-methyl-N-vinylacetamide (VIMA) and iso-propylmethacrylamide (VIMA/iPMAM), VIMA and methacryloylpyrrolidine (VIMA/MAPYD), and EPOCROS® WS-300, a terpolymer of methyl methacrylate, ethyl acrylate and iso-propenyloxazoline supplied by Nippon Shokubai.

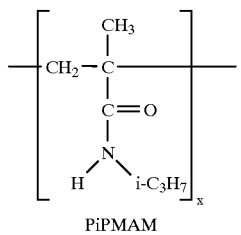

PiPMAM

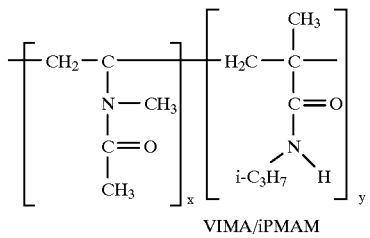

VIMA/iPMAM

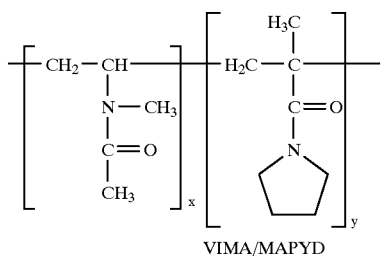

VIMA/MAPYD

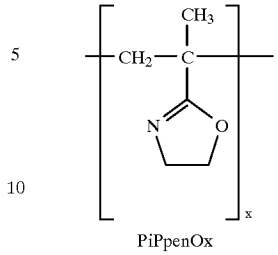

PiPpenOx

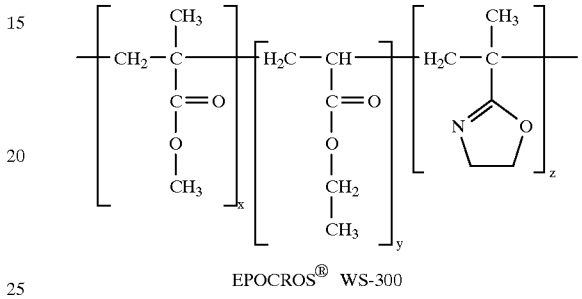

EPOCROS® WS-300

Maleimide Copolymers

Some examples of maleimide copolymers that are likely to function as gas hydrate inhibitors include those comprising an acrylamide, N-vinyl amide, alkenyl cyclic imino ether, or acryloylamide monomer unit in combination with a maleimide monomer unit. Such copolymers include, but are not limited to, those described below.

Acrylamide/Maleimide copolymers likely to function as gas hydrate inhibitors include:

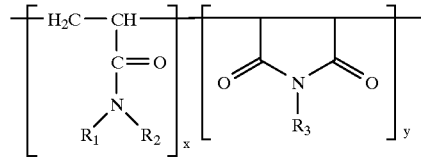

where $R_1$ is a hydrogen or hydrocarbon group (branched, normal, or cyclic) having one to ten carbon atoms and zero to four heteroatoms selected from the group consisting of oxygen, nitrogen, sulfur and combinations thereof, $R_2$ is a hydrocarbon group (branched, normal, or cyclic) having one to ten carbon atoms and zero to four heteroatoms selected from the group consisting of oxygen, nitrogen, sulfur, and combinations thereof, $R_3$ is a hydrogen or hydrocarbon group (branched, normal, or cyclic) having one to six carbon atoms, and, x+y is an average number of monomeric units for producing an average molecular weight for said polymer between about 1,000 and about 6,000,000 for said polymer;

N-Vinyl amide/Maleimide copolymers likely to function as gas hydrate inhibitors include:

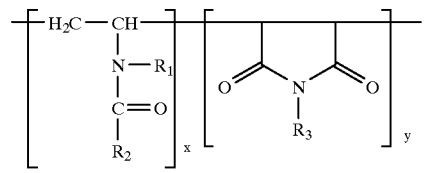

where, $R_1$ is a hydrogen or hydrocarbon group (branched, normal, or cyclic) having one to six carbon atoms and zero to two heteroatoms selected from the group consisting of oxygen and nitrogen, and combinations thereof, $R_2$ is hydrocarbon group (branched, normal, or cyclic) having one to six carbon atoms and zero to two heteroatoms selected from the group consisting of oxygen and nitrogen, and combinations thereof, $R_3$ is a hydrogen or hydrocarbon group (branched, normal, or cyclic) having one to six carbon atoms, and, x+y is an average number of monomeric units for producing an average molecular weight for said polymer between about 1,000 and about 6,000,000 for said polymer.

Vinyl lactam/Maleimide copolymers likely to function as gas hydrate inhibitors include:

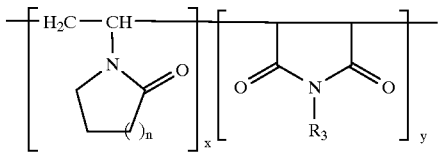

where, n ranges from one to three, $R_3$ is a hydrogen or hydrocarbon group (branched, normal, or cyclic) having one to six carbon atoms, and x+y is an average number of monomeric units for producing an average molecular weight for said polymer between about 1,000 and about 6,000,000 for said polymer.

Alkenyl cyclic imino ether/Maleimide copolymers likely to function as gas hydrate inhibitors include:

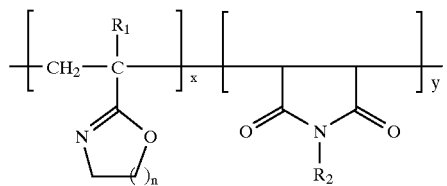

where, n ranges from one to four, $R_1$ is a hydrogen or methyl group, $R_2$ is a hydrogen or hydrocarbon group having one to six carbon atoms, and, x+y is an average number of monomeric units for producing an average molecular weight for said polymer between about 1,000 and about 6,000,000 for said polymer.

Acryloylamide/Maleimide copolymers likely to function as gas hydrate inhibitors include those copolymers where the $R_1$ and $R_2$ groups of the corresponding acrylamide/maleimide copolymers are linked to form a nitrogen containing cyclic structure having three to ten carbon atoms and one to four heteroatoms selected from the group consisting of oxygen, nitrogen, sulfur and combinations thereof.

N,N-Diallylamide Polymers

Certain N,N-diallylamides likely to function as gas hydrate inhibitors include:

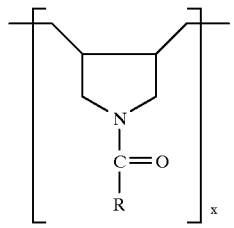

where, R is a hydrocarbon group having one to ten carbon atoms and zero to four heteroatoms selected from the group consisting of oxygen, nitrogen, sulfur and combinations thereof, and x is an average number of monomeric units for producing an average molecular weight for said polymer between about 1,000 and about 6,000,000 for said polymer.

It will be apparent to those skilled in the art how the above-described examples were selected using the method discussed below for predetermining polymers likely to function as gas hydrate inhibitors. Also, other polymer systems will become evident in light of these illustrative examples and discussion of the method provided herein.

Applying the Inhibitor in the Field

Once various inhibitors are predetermined using the above procedure and evaluated using the mini-loop testing procedure described above, the more effective inhibitors may be evaluated either in a large loop lab apparatus and/or in an actual field application for inhibiting the formation of clathrate hydrates. Formation of clathrate hydrates means the nucleation, growth, and/or agglomeration of clathrate hydrates. Such clathrate hydrates may be formed in a fluid whether it is flowing or substantially stationary, but are often most problematic in flowing fluid streams conveyed in a pipe. For example, flow restrictions arising from partial or complete blockages in a fluid stream can arise as clathrate hydrates adhere to and accumulate along the inside wall of the pipe used to convey the fluid. Nonetheless, the invention can be used for inhibiting formation of clathrate hydrates in substantially stationary fluids.

In one embodiment of the invention, a concentrated solution or mixture of one or more of the inhibitors of the type described above is introduced into a petroleum fluid stream having an aqueous phase. As the inhibitor solution or mixture of this invention is substantially dissolved in the aqueous phase or dispersed in the fluid stream it reduces the rate that clathrate hydrates are formed, and thereby reduces the tendency for a flow restriction to occur.

In a preferred embodiment, the solid polymer is first dissolved into an appropriate carrier solvent or liquid to make a concentrated solution or mixture. It should be understood that many liquids may effectively facilitate treatment of the fluid stream without dissolving the inhibitor. Many liquids, however, will preferably dissolve the inhibitor and, for convenience, are referred to hereafter as solvents whether they produce an inhibitor solution, emulsion, or other type of mixture. The solvent's principal purpose is to act as a carrier for the inhibitor and to facilitate the inhibitor's absorption into the aqueous phase of the petroleum fluid. Any solvent suitable for delivering the inhibitor to the fluid's aqueous phase may be used. Such solvents include, but are not limited to, water, brine, sea water, produced water, methanol, ethanol, propanol, isopropanol, glycol, or mixtures of such solvents. Other solvents familiar to those skilled in the art may also be used.

It should be understood that the use of a carrier solvent is not required to practice the invention, but it is a convenient method of introducing the inhibitor into the fluid. In many applications the use of a carrier solvent will facilitate treatment of the fluid stream.

Any convenient concentration of inhibitor in the carrier solvent can be used, so long as it results in the desired final concentration in the aqueous phase of the petroleum fluid. Higher concentrations are preferred, since they result in a reduced volume of concentrated solution to handle and introduce into the petroleum fluid. The actual concentration used in a specific application will vary depending upon the selection of carrier solvent, the chemical composition of the inhibitor, the system temperature, and the inhibitor's solubility in the carrier solvent at application conditions.

The inhibitor mixture is introduced into the aqueous phase of the petroleum fluid using mechanical equipment, such as, chemical injection pumps, piping tees, injection fittings, and other devices which will be apparent to those skilled in the art. However, such equipment is not essential to practicing the invention. To ensure an efficient and effective treatment of the petroleum fluid with the inhibitor mixture two points should be considered.

First, an aqueous phase is preferably present at the location, typically the wellhead, where the inhibitor solution is introduced into the fluid. Also, the aqueous phase used for injecting the inhibitor should be below the inhibitor solution's LCST. Alternatively, the inhibitor solution may be injected elsewhere in the water-gas system where the temperature is below the polymer solution's LCST. However, In some petroleum fluid systems, particularly natural gas systems, an aqueous phase does not appear until the gas has cooled sufficiently for water to condense. If this is the case, the inhibitor solution is preferably after the water has condensed. Alternatively, in the event that an aqueous phase is not available at the point the inhibitor solution is introduced, the inhibitor solution concentration should be selected to ensure that the inhibitor solution's viscosity is sufficiently low to facilitate its dispersion through the fluid and permit it to reach the aqueous phase.

Second, because the inhibitor primarily serves to inhibit the formation of clathrate hydrates, rather than reverse such formation, it is important to treat the fluid prior to substantial formation of clathrate hydrates. As a wet petroleum fluid cools it will eventually reach a temperature, known as the hydrate equilibrium dissociation temperature or $T_{eq}$, below which hydrate formation is thermodynamically favored. A petroleum fluid's $T_{eq}$ will shift as the pressure applied to the fluid and its composition change. Various methods of determining a fluid's $T_{eq}$ at various fluid compositions and pressures are well known to those skilled in the art. Preferably, the fluid should be treated with the inhibitor when the fluid is at a temperature greater than its $T_{eq}$. It is possible, but not preferable, to introduce the inhibitor while the temperature is at or slightly below the fluid's $T_{eq}$, preferably before clathrate hydrates have begun to form.

The quantity of inhibitor introduced into a petroleum fluid with an aqueous phase solvent will typically vary between about 0.01 wt. % to about 5 wt. % by weight of the water present in the fluid. Preferably, the inhibitor concentration will be about 0.5 wt. %. For example, a laboratory study has shown that adding 0.5 wt. % of a copolymer of N-methyl-N-vinylacetamide and acryloylpyrrolidine (VIMA/APYD) to a petroleum fluid allowed the fluid to cool to a temperature which was about 15.5° C. below its $T_{eq}$ without rapid formation of a hydrate blockage. A higher inhibitor concentration can be used to lower the temperature at which a hydrate blockage is obtained. A suitable concentration for a particular application, however, can be determined by those skilled in the art by taking into account the inhibitor's performance under such application, the degree of inhibition required for the petroleum fluid, and the inhibitor's cost.

The means and method invention and the best mode contemplated for practicing the invention have been described. It is to be understood that the foregoing is illustrative only and that other means and techniques can be employed without departing from the true scope of the invention claimed herein.

We claim:

1. A method for selecting an inhibitor useful in inhibiting the formation of clathrate hydrates in a petroleum fluid having hydrate forming constituents wherein the inhibitor is a substantially water soluble polymer having a guest group, a polymer backbone, and an anchor group positioned there between, said method comprising:

(a) selecting a polymer backbone which (i) sterically hinders the growth of hydrate nuclei, (ii) produces a substantially water soluble polymer, and (iii) is selected from the group consisting of polyethylene, polypropylene, polyimine, and polyglycols;

(b) selecting as the anchor group a hydrophilic hydrogen bonding group which (i) produces a substantially water soluble polymer, (ii) has between one and four hydrogen bonding sites for water molecules, and (iii) binds at least four water molecules in a non-freezable state; and (c) selecting the guest group from the group consisting of hydrophobic and amphiphilic groups, both having (i) a ratio of carbon atoms to heteroatoms greater than or equal to about two to one; and (ii) an average van der Waals diameter between about 3.8 angstroms and about 8.6 angstroms.

2. The method of claim 1 wherein the guest group has a shape that allows water molecules to form a shell around the guest group which approximates a hydrate nuclei structure.

3. The method of claim 2 wherein the nuclei structure is selected from the group consisting of pentagonal dodecahedron, tetrakaidecahedron, hexakaidecahedron, and icosahedron.

4. The method of claim 2 wherein the guest group is a hydrophobic, saturated hydrocarbon group in a straight chain, branched or cyclic configuration.

5. The method of claim 4 wherein the guest group approximates a spherical shape selected from the group of neopentane and cyclopentane.

6. The method of claim 1 wherein the polymer is a glass-forming polymer which inhibits long-range ordering required for hydrate nucleation by binding an average of at least four water molecules per monomeric unit of the polymer and maintaining the water molecules in their liquid state.

7. The method of claim 1 wherein the polymer is a copolymer and has secondary repeat units to act as spacers along the polymer chain.

* * * * *